United States Patent [19]

Yoshioka et al.

[11] Patent Number: 4,597,856
[45] Date of Patent: Jul. 1, 1986

[54] PROCESS FOR FLUIDIZED CATALYTIC CRACKING OF HEAVY OILS AND PRODUCTION OF HYDROGEN

[75] Inventors: Susumu Yoshioka, Ibaraki; Nobuo Matsuo, Hiroshima; Nobuyasu Meguri, Hiroshima; Tadashi Murakami, Kanagawa; Yasushi Ishibashi; Kenichi Matsuda, both of Okayama; Teruo Suzuka; Satoshi Fukase, both of Saitama; Hidetaka Ohse, Tokyo, all of Japan

[73] Assignee: Processing Research Association of Residual Oil, Tokyo, Japan

[21] Appl. No.: 661,750

[22] Filed: Oct. 17, 1984

[30] Foreign Application Priority Data

Oct. 17, 1983 [JP] Japan ............................. 58-192342

[51] Int. Cl.⁴ ............................................ C10G 47/02
[52] U.S. Cl. ........................................ 208/112; 208/121; 208/147
[58] Field of Search .............. 208/113, 107, 112, 108, 208/121, 124, 151, 159, 158, 127, 130

[56] References Cited

U.S. PATENT DOCUMENTS

| | | | |
|---|---|---|---|
| 2,967,878 | 1/1961 | Fenske et al. | 208/113 |
| 3,097,156 | 7/1963 | Johnson et al. | 208/124 |
| 4,298,460 | 11/1981 | Fujimori et al. | 208/121 |
| 4,325,812 | 4/1982 | Fujimori et al. | 208/121 |
| 4,334,920 | 6/1982 | Mori et al. | 208/124 |
| 4,399,023 | 8/1983 | Suzuka et al. | 208/112 |
| 4,420,332 | 12/1983 | Mori et al. | 208/112 |
| 4,421,635 | 12/1983 | Murakami et al. | 208/112 |

*Primary Examiner*—Andrew H. Metz
*Assistant Examiner*—Anthony McFarlane
*Attorney, Agent, or Firm*—Sughrue, Mion, Zinn, Macpeak & Seas

[57] ABSTRACT

A process for fluidized catalytic cracking of heavy oils and production of hydrogen is described, comprising contacting steam and heavy oils with fluidized catalyst particles containing reduced iron at high temperatures, wherein a fluidized bed is formed such that the catalyst particles are fed from the bottom and withdrawn from the top of the fluidized bed and the fluidized bed is provided with a means for retarding the mixing rate of the catalyst particles in the vertical direction, to thereby generate a temperature difference between zones of the fluidized bed above and below said means, and use the upper zone for cracking of heavy oils and the lower zone for production of hydrogen. Catalyst particles withdrawn from the fluidized bed may be regenerated and recycled. Thus, light oils and hydrogen can be produced in high yields.

7 Claims, 1 Drawing Figure

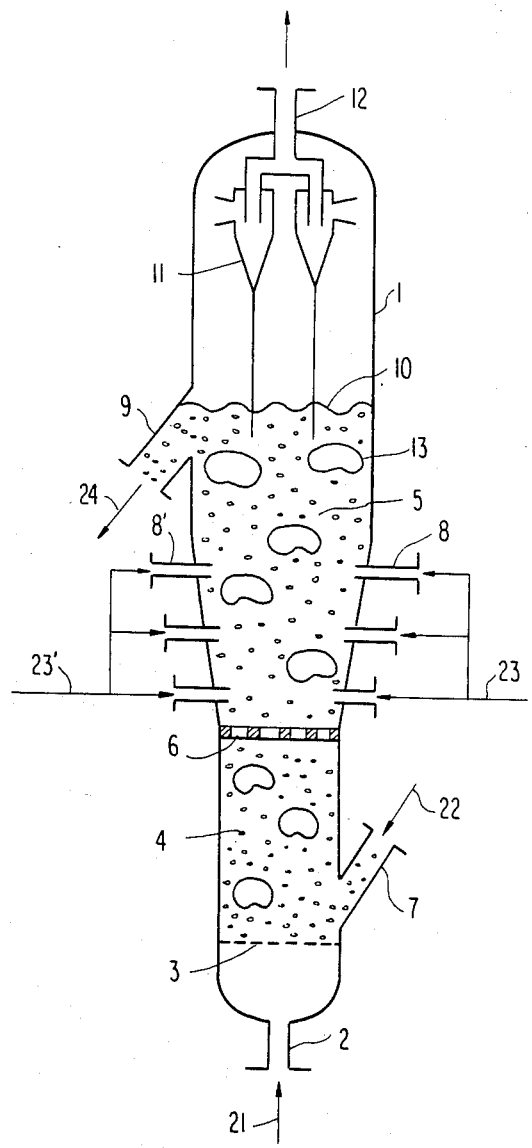

PROCESS FOR FLUIDIZED CATALYTIC CRACKING OF HEAVY OILS AND PRODUCTION OF HYDROGEN

FIELD OF THE INVENTION

This invention relates to a process for fluidized catalytic cracking of heavy oils and production of hydrogen. More specifically, this invention relates to a process for fluidized catalytic cracking of heavy oils and production of hydrogen, which comprises contacting steam and heavy oils with fluidized catalyst particles containing reduced iron (Fe, FeO) at high temperatures, whereby hydrogen is produced by the steam-iron reaction ($3Fe + 4H_2O \rightarrow Fe_3O_4 + 4H_2$, $3FeO + H_2O \rightarrow Fe_3O_4 + H_2$) and cracked gases and cracked light oils are produced by the cracking reaction of the heavy oils.

BACKGROUND OF THE INVENTION

Processes for producing light oils and hydrogen from heavy oils have previously been proposed which comprise contacting catalyst particles containing reduced iron with heavy oils and steam in the same fluidized bed reactor at from 500° to 800° C. to crack the heavy oils into light oils and generate hydrogen, burning the coke (carbonaceous component) deposited on the catalyst in a reducing atmosphere to remove it, reducing iron oxide in the catalyst, and recycling the catalyst to bring it again into contact with heavy oils and steam, and an additional step of withdrawing a part of the recycled catalyst and roasting iron sulfide in the catalyst which has been formed during the above reaction. Such is described, e.g., in U.S. Pat. Nos. 4,325,812, 4,421,635 and 4,399,023.

In order to minimize the formation of cracked gases and increase the amount of the light oils obtained by the cracking of heavy oils in the above processes, the temperature of the fluidized bed should preferably be maintained at from 500° to 560° C. However, since the rate of the steam-iron reaction is slow in this temperature range, the temperature of the fluidized bed is preferably maintained at from 600° to 800° C. in order to increase the amount of hydrogen and decrease the volume of the reactor.

The mixing rate of the fluidized particles in the fluidized bed is very high, and the temperature distribution in the bed is nearly uniform. Hence, when the cracking reaction of the heavy oils and the production of hydrogen by the steam-iron reaction are carried out simultaneously at the same temperature in one fluidized bed reactor, the yield of either or both of the light oils and hydrogen must be sacrified.

Furthermore, during the catalytic cracking in the above processes, the reduced iron in the catalyst contacts with sulfur components in the heavy oils to form a large amount of iron sulfide which is unusable to produce hydrogen. Accordingly, the amount of the catalyst which is withdrawn for roasting iron sulfide becomes large, and the reduced iron is wastefully consumed for roasting together with iron sulfide. This is technically and economically undesirable.

SUMMARY OF THE INVENTION

It is an object of this invention to provide a process for fluidized catalytic cracking of heavy oils and production of hydrogen in the same fluidized bed reactor, wherein cracked light oils and hydrogen can be produced in high yields economically by bringing temperature zones suitable for the respective reactions and minimizing the formation of iron sulfide.

According to this invention, a process is provided for fluidized catalytic cracking of heavy oils and production of hydrogen comprising contacting steam and heavy oils with fluidized catalyst particles containing reduced iron at high temperatures, wherein a fluidized bed is formed such that the catalyst particles are fed from the bottom and withdrawn from the top of the fluidized bed and the fluidized bed is provided with a means for retarding the mixing rate of the catalyst particles in the vertical direction, to thereby generate a temperature difference between zones of the fluidized bed above and below said means, and use the upper zone for cracking of heavy oils and the lower zone for production of hydrogen.

The heavy oil cracking zone can thereby be kept at a temperature of from 500° to 560° C., and the hydrogen-producing zone can be kept at a temperature of from 600° to 800° C. The means for retarding the mixing rate of the catalyst particles in the vertical direction can be an object which is inserted in the fluidized bed and has a fraction of opening area of about 10 to 70%.

BRIEF DESCRIPTION OF THE DRAWING

The FIGURE is a view showing the structure of a fluidized catalytic cracking reactor for heavy oils in accordance with an embodiment of this invention.

DETAILED DESCRIPTION OF THE INVENTION

The process for the fluidized catalytic cracking of heavy oils and the production of hydrogen to which the present invention is applied is described below.

In a first step of the process, catalyst particles containing reduced iron recycled from a second step are brought into contact with heavy oils and steam at a temperature of from 500° to 800° C. and a pressure of from 0 to 15 kg/cm²·G (gauge). As a result, the heavy oils are cracked to produce cracked gases and cracked oils, and coke is deposited on the catalyst. At the same time, reduced iron in the catalyst reacts with steam, and the reduced iron is oxidized to generate hydrogen.

Then, the catalyst having the coke deposited thereon and containing oxidized iron (mainly $Fe_3O_4$) is sent to the second step, and is regenerated by burning the coke at a temperature of from 750° to 950° C. under a pressure of from 0 to 15 kg/cm²·G. At this time, an oxygen-containing gas is supplied in an amount insufficient for complete burning of the coke and a fuel added as required in the second step for maintaining the temperature at from 750° to 950° C., particularly in an amount corresponding to an oxygen/carbon mole ratio ($O_2/C$) of from 0.1 to 0.6, to reduce iron oxide in the catalyst and thus regenerate the catalyst. The regenerated catalyst is then recycled to the first step, and the cracking of the heavy oils and the production of hydrogen are carried out in the first step.

During the cracking of the heavy oils in the first step, sulfur compounds in the heavy oils react with reduced iron in the catalyst to form iron sulfide. In the second step, too, sulfur components in the coke react with reduced iron during the burning of the coke to form iron sulfide. When the catalyst is used for an extended period of time, the amount of iron sulfide increases and consequently decreases the amount of hydrogen produced in the first step. Accordingly, a third step of regenerating the catalyst by roasting iron sulfide in the catalyst at a temperature of from about 600° to 1000° C. may be included if required in the above process.

The present invention is applied particularly to the first step of the above process. Specifically, the reduced iron-containing catalyst particles from the second step are introduced into the bottom of the catalyst bed in the first step. Catalyst particles containing oxidized iron are withdrawn from the top of the catalyst bed and sent to the second step. The catalyst bed is formed into a fluidized bed by steam and heavy oils fed and a fluidizing gas to be introduced as required, such as nitrogen gas and cracked gases. A means for retarding the mixing rate of the catalyst particles in the vertical direction (to be referred to as the retarding means) is provided in the fluidized bed. This is accomplished, for example, by inserting an object therein, or blowing a fluid into the fluidized bed in the horizontal direction to retard the mixing rate. By retarding the mixing rate of the catalyst particles in the vertical direction, it is possible to generate a temperature difference between the upper zone and the lower zone of the fluidized bed above and below the retarding means. This temperature difference arises due to the heat contents of the introduced catalyst particles and the difference in the heat of reaction, i.e. between the rather large endotherm of the cracking reaction and the exotherm of the steam-iron reaction.

By introducing steam into the lower zone, the steam-iron reaction takes place in the lower zone whereby reduced iron in the catalyst particles in the reduced state is oxidized to generate hydrogen. The catalyst particles in the oxidized state then move to the upper zone beyond the retarding means.

In the upper zone, the heavy oils are fed, and catalytically cracked to give cracked products such as cracked gases and cracked light oils. These products are removed from the reaction system together with hydrogen produced in the lower zone and unreacted steam.

The catalyst used in the process can be prepared by pulverizing, kneading, granulating and calcining materials having a very high iron content, such as natural ores containing iron in the form of hydroxide, oxide or carbonate (e.g., laterite, magnetite, siderite, limonite and hematite), or chemical compositions of iron oxides, hydroxides or carbonates, or iron or iron oxide powder obtained from the steel industry, as by-products, or mixtures thereof with inorganic materials, such as alumina, silica, magnesia, calcium hydroxide, and nickel oxide, and natural ores, e.g., garnierite, dolomite and limestone. To have high catalytic activity, these catalyst particles preferably have a specific surface area of from 0.1 to 30 $m^2/g$, and for use in a fluidized bed, the catalyst particles preferably have a mean diameter of from 60 to 660 $\mu m$. When the iron (Fe) content of the catalyst is below 30% by weight, only a small amount of hydrogen can be produced. It is, therefore, preferable for the catalyst to contain at least 30% by weight Fe. The Fe content preferably does not exceed 70% by weight because otherwise bogging (i.e., sintering and agglomeration of catalyst particles) occurs during the reduction of the catalyst in the second step.

One preferred embodiment of this invention will now be described with reference to the FIGURE which shows a reactor suitable for the first step of the above process.

The fluidized catalytic cracking reactor shown at 1 has a steam feeding pipe 2 and a steam dispersing plate 3 at its lower portion. Steam 21 fed into the reactor 1 through the feeding pipe 2 and the dispersing plate 3 fluidizes catalyst particles 4 occupying the reactor 1 to form a fluidized bed 5. In the middle part of the fluidized bed 5 is disposed a retarding means 6 extending over the cross-section of fluidized bed 5. Below the retarding means 6 is provided a feed pipe 7 for supplying catalyst particles 22 containing reduced iron at from 750° to 950° C. which are recycled from the second step. Above the retarding means 6 and on the periphery of the reactor 1 are provided a plurality of feed nozzles 8, 8' for heavy oils 23, 23' in a multiplicity of stages. A pipe 9 for withdrawing catalyst particles 24 is provided further above the retarding means 6. A plurality of cyclones 11 are disposed above the surface 10 of the fluidized bed 5, and a discharge pipe 12 for the cracked products is connected to the cyclones 11. Cloud-like objects 13 shown in the fluidized bed 5 are a schematic representation of bubbles generated within the bed 5 by the steam 21 and the reaction product gases. Generally, the particles in the fluidized bed 5 are fluidized and stirred by these bubbles, and attain a very high mixing rate.

In operation, the catalyst particles 22 containing reduced iron such as FeO at from 750° to 950° C. are fed from the feed pipe 7 into the lower portion of the retarding means 6 and fluidized by the steam 21 fed through the feeding pipe 2 and the dispersing plate 3. At the same time, reduced iron in the catalyst reacts with steam to produce hydrogen and be oxidized. The unreacted steam and the resulting hydrogen rise while fluidizing the catalyst particles. In the upper zone of the fluidized bed 5 above the retarding means 6, the catalyst particles which have risen through the retarding means 6 contact with heavy oils 23, 23' supplied and sprayed from the feed nozzles 8, 8' in the fluidized state to crack them into light oils. The gases and light oils resulting from the cracking of the heavy oils leave the upper surface 10 of the fluidized bed 5 together with the resulting hydrogen and unreacted steam rising while fluidizing the catalyst particles. The catalyst particles entrained from the fluidized bed 5 are removed by the cyclones 11, and then the remaining gas is sent to the next refining step from the discharge pipe 12. For example, the discharged gas is introduced into a scrubbing column or a distillation column (not shown) where it is first separated into uncracked heavy hydrocarbons and cracked products. The uncracked heavy hydrocarbons are returned and mixed with a feedstock, heavy hydrocarbons, and again subjected to the cracking reaction. The hydrogen, cracked gases, cracked light oil and so forth are separated and recovered by known refining steps as a gaseous mixture which contains hydrogen as the major component, and, additionally, methane, ethane, ethylene, $C_3$ fractions, $C_4$ fractions, and hydrogen sulfide ($H_2S$). This gaseous mixture can be separated into high purity hydrogen and hydrogen sulfide, and propane, butane and other light hydrocarbon gases by suitable means, such as distillation, an amine absorption method, a pressure swing adosrption method [PSA method (see, for example, *CEP*, January (1976), pp. 44–49)] and a cryogenic processing [see, for example, *CEP*, September (1969), pp. 78–83] which may be used alone or in combination with each other. For example, the mixture can first be freed of $C_3$ and $C_4$ fractions by distillation or absorption, then freed of $H_2S$ by amine absorption, and then freed of hydrogen and light hydrocarbon gases such as methane, ethane, and ethylene by the pressure swing adsorption method or cryogenic processing.

The cracked light oil is fed to the refining step where it is separated into a naphtha fraction, a kerosene fraction, a gas oil fraction, etc., which are desulfurized in a desulfurization step to provide the desired end products.

In the meantime, the catalyst particles having the coke deposited thereon overflow from the withdrawing pipe 9 and are sent to the second step. By the aforesaid behavior in reactor 1, the retarding means 6 can generate a temperature difference between the upper zone and the lower zone of the fluidized bed 5 partitioned by the retarding means 6. When the upper zone is maintained at a temperature of from 500° to 560° C., and preferably from 510° to 540° C., which is advantageous for the formation of light oils in high yields, it is possible to secure a higher temperature of from 600° to 800° C., and specifically from 650° to 750° C., in the lower zone, which is advantageous for the reaction of steam with reduced iron.

This is an effect of retarding the mixing rate of the catalyst particles between the upper and lower zones of the fluidized bed 5 by the retarding means 6. In other words, by reducing the amount of movement of the catalyst particles existing in the upper zone to below the retarding means 6, the lower zone of the fluidized bed 5 below the retarding means 6 undergoes less cooling.

As a result of retarding of the movement of the catalyst particles in the vertical direction, reduced iron in the catalyst is first oxidized with steam, and thereafter, catalytic cracking of the heavy oils takes place. Sulfur components in the heavy oils directly rarely react with reduced iron to form iron sulfide because the reduced iron is oxidized in the lower zone. Hence, the accumulation of iron sulfide in the catalyst can be decreased.

The retarding means 6 may, for example, be a perforated plate, an array of pipes in lattice form, a steel rod or a steel plate having a fraction of opening area, with respect to the cross-sectional area of the fluidized bed, of from 10 to 70%. The fraction of opening area is properly selected within the aforesaid range of from 10 to 70% depending upon the properties, particularly the particle diameter of the fluidized catalyst particles, and the superficial gas velocity in the fluidized bed. The inventors found that the mixing rate of the catalyst particles per unit area of opening area of the retarding means is a function of a ratio of minimum fluidization velocity of the particles to superficial gas velocity and that the preferable fraction of opening area of the retarding means can be approximately obtained by the following equation:

$$\epsilon^2 = 50 \times \frac{D_p}{\sqrt{U_o}}$$

wherein $D_p$ is an average diameter of the catalyst particles ($\mu$m), $U_o$ is a superficial gas velocity (cm/s), and $\epsilon$ is a fraction of opening area of the retarding means (%). For example, when the catalyst particles containing reduced iron have an average diameter of about 130 $\mu$m and the superficial gas velocity is about 60 cm/s (centimater/second), the fraction of opening area is preferably from 25 to 35%. When the catalyst particles have an average diameter of about 560 $\mu$m and the fluidized bed has a superficial gas velocity of about 60 cm/s, the fraction of opening area is preferably from 55 to 65%. Furthermore, a fraction of opening area of from 15 to 25% is preferred for an average diameter of about 60 $\mu$m and a superficial gas velocity of about 40 cm/s. The fractions of opening area of less than 10% are undesirable because the circulation of the catalyst particles between the first and second steps is excessively inhibited.

The height at which the retarding means 6 is provided is determined by the time within which the reaction of reduced iron in the catalyst particles with steam in the lower zone of the fluidized bed 5 below the retarding means 6 is carried out. When the temperature of the lower zone is 600° C. for example, the above height may be such that an average residence time of at least 5 minutes can be secured for the above catalyst particles. If the above temperature is above 600° C., the required residence time can be shorter.

The mixing rate of the catalyst particles between above and below the retarding means 6 can be changed by changing the superficial gas velocity at the position at which the retarding means 6 is provided within a range that can maintain the operation of the cracking reaction stable. By detecting the temperature difference between the upper and lower zones and adjusting the amount of steam fed from the feeding pipe 2, the temperature of the lower zone at a predetermined upper zone temperature can be controlled.

The following Reference Examples and Example illustrate the specific effects of the present invention.

REFERENCE EXAMPLE 1

Natural ore (laterite) containing 57.4 wt. % of Fe, 1.2 wt. % of Ni, 0.8 wt. % of MgO, 2.7 wt. % of $SiO_2$, and 6.6 wt. % of $Al_2O_3$ was granulated to an average particle diameter of 0.2 mm, and calcined at a temperature of 1150° C. for 3 hours to produce a catalyst. The catalyst was reduced with hydrogen at a temperature of 850° C. to give reduced catalysts containing FeO in an amount of 36.5 wt. %, 9.3 wt. % and 5.5 wt. %, respectively by changing the reducing time.

Three grams of the reduced catalyst was filled in a column having an inside diameter of 12 mm, and under the reaction conditions shown in Table 1, the ratio of capturing hydrogen sulfide was measured. The results are shown in Table 1.

TABLE 1

| Catalyst | FeO content (wt. %) | 36.5 | 9.3 | 5.5 | 0 |
|---|---|---|---|---|---|
| Reaction conditions | Pressure | 1 atm. | | | |
| | Temperature | 510° C. | | | |
| | Time | 5 minutes | | | |
| | Amount of $H_2S$ fed | 38.3 ml | | | |
| | Concentration of $H_2S$ | 1.4 vol. % | | | |
| | Superficial gas velocity | 23 cm/sec. | | | |
| | Partial pressure of $H_2O$ | 0.73 atm. | | | |
| Results | $H_2S$ capturing ratio (vol. %) | 97.5 | 58.2 | 42.6 | 32.1 |

The results show that if steam is present together and the amount of FeO in the catalyst decreases, the amount of the sulfur compound which is captured by the catalyst decreases.

REFERENCE EXAMPLE 2

Using the catalyst prepared in Reference Example 1, heavy oils were cracked and hydrogen was produced by steam-iron reaction in the first step. In the second step, the catalyst was regenerated by reduction and the experiment was continuously performed by circulating the catalyst between the first and second steps. The conditions employed were as follows:

Size of the devices

First step: inside diameter 12.7 cm, height 160 cm
Second step: inside diameter 15.1 cm, height 180 cm Properties of the heavy oils Specific gravity (15/4° C.): 1.0440
Sulfur content (wt. %): 5.62

Experimental conditions (First step)
  Catalyst hold up: 13 kg
  Amount of the heavy oils fed: 3 kg/hr
  Amount of steam fed: 3.0 kg/hr
  Temperature: 540° C.
  Pressure: 1 kg/cm$^2$
(Second step)
  Catalyst hold up: 20 kg
  Amount of air fed: 3 Nm$^3$/hr
  Temperature: 830° C.
  Pressure: 1 kg/cm$^2$
  Amount of the catalyst recycled: 20 kg/hr When the above process was operated for an extended period of time under the above conditions, the average content of FeO in the catalyst at the exit of the second step, which was recycled to the first step, was 19.2% by weight.

Then, the amount of air in the second step was increased to 4.5 Nm$^3$/hr, and the average content of FeO at the exit of the second step was decreased to 3.0% by weight.

The distribution of sulfur components present in the heavy oils in these experiments was determined, and the results are shown in Table 2.

TABLE 2

| FeO content (wt. %) | 19.2 | 3.0 |
|---|---|---|
| Sulfur components that transferred to the cracked gases (wt. %) | 8.8 | 14.8 |
| Sulfur components that transferred to the cracked oils (wt. %) | 57.2 | 57.1 |
| Sulfur components that transferred to the catalyst and the coke (wt. %) | 34.0 | 28.1 |

It is seen from the above results that when FeO is present in a large amount in the catalyst, the ratio of capturing by the catalyst of gaseous sulfur compounds formed by the cracking of the heavy oils increases.

EXAMPLE

An apparatus of the type shown in the FIGURE having the following specification was used.
Retarding means 6: a perforated plate having a fraction of opening area of 30% and an opening diameter of 45 mm
Diameter of the lower zone of the fluidized bed below the retarding means 6: 440 mm
Diameter of the upper conical section of the fluidized bed having feed nozzles 8,8' for heavy oils 23, 23' provided therein: 800 mm
Setting height of the retarding means 6 from the dispersing plate 3: 3.5 m
Setting height of the feed pipe 7 for catalyst particles 22 from the dispersing plate 3: 0.6 m Catalyst particles 22 having an average particle diameter of 130 μm from the second step were fed at a temperature of 830° C. and at a rate of 11.5 tons/hour. Steam 21 was fed from the feeding pipe 2 such that the superficial gas velocity at the cross-sectional area of the retarding means 6 became 0.63 m/s. Furthermore, vacuum residual oil (specific gravity 1.03) was fed from nozzles 8, 8', and cracked by maintaining the temperature of the upper zone of the fluidized bed above the retarding means 6 at 540° C. The level of the fluidized bed surface 10 was maintained by withdrawing the catalyst particles 24 from the withdrawing pipe 9. As a result, the temperature of the lower zone of the fluidized bed below the retarding means 6 became 685° C., which was from 140° to 150° C. higher than in the case of a uniform temperature distribution in the absence of the retarding means 6 (comparison).

The experimental results are shown in Table 3.

The results clearly show that the amount of hydrogen formed could be increased. X-ray diffraction analysis of the catalyst withdrawn from the first step in the above experiment showed that FeO did not substantially exist in the catalyst particles. This is evidence that the oxidation reaction fully proceeded.

TABLE 3

|  | Invention | Comparison |
|---|---|---|
| Cracking temperature (°C.) | 540 | 540 |
| Temperature of the hydrogen-producing zone (°C.) | 685 | |
| Regeneration temperature (°C.) | 830 | 830 |
| Amount of the feed asphalt (BSD) | 200 | 200 |
| Amount of the catalyst recycled (tons/hour) | 11.5 | 11.5 |
| Amount of hydrogen produced (Nm$^3$/Kl asphalt) | 180 | 133 |

Catalyst: Laterite catalyst (the same as described in Reference Example 1)
  Average particle diameter: 130 μm
  Bulk density: 2.2 g/cm$^3$ Since according to this invention temperature zones suitable respectively for the cracking of heavy oils and the production of hydrogen can be carried out within the same fluidized bed reactor, light oils and hydrogen can be obtained in high yields.

Furthermore, the amount of iron sulfide accumulated in the catalyst can be decreased, and the amount of the catalyst which is required for roasting iron sulfide can be decreased.

While the invention has been described in detail and with reference to specific embodiments thereof, it will be apparent to one skilled in the art that various changes and modifications can be made therein without departing from the spirit and scope thereof.

What is claimed is:

1. A process for fluidized catalytic cracking of heavy oils and production of hydrogen comprising contacting steam and heavy oils with fluidized catalyst particles containing reduced iron at high temperatures, wherein a fluidized bed is formed said fluidized bed having a lower zone, an upper zone and a means for retarding mixing of fluidized particles between said lower zone and said upper zone, wherein said catalyst particles containing reduced iron are first contacted with steam to produce hydrogen in said lower zone;

said catalyst particles are then passed into said upper zone above said means for retarding mixing; and said heavy oils are cracked in said upper zone.

2. A process as in claim 1, wherein the temperature of the upper zone is maintained at from 500° to 560° C., and the temperature of the lower zone is maintained at from 600° to 800° C.

3. A process as in claim 2, wherein the temperature of the upper zone is maintained at from 510° to 540° C., and the temperature of the lower zone is maintained at from 650° to 750° C.

4. A process as in claim 1, wherein said means is an object inserted in the fluidized bed which has a fraction of opening area of from about 10 to 70%.

5. A process for fluidized catalytic cracking of heavy oils and production of hydrogen comprising contacting steam and heavy oils with fluidized catalyst particles containing reduced iron at high temperatures in a fluidized bed, said fluidized bed having a lower zone, an upper zone and a means for retarding mixing of fluidized particles between said lower zone and said upper zone, wherein in a first step said catalyst particles containing reduced iron are first contacted with steam to form hydrogen in said lower zone;

said catalyst particles are then passed into said upper zone above said means for retarding mixing; and said heavy oils are cracked in said upper zone;

and in a second step said catalyst particles are withdrawn from said upper zone and regenerated and the regenerated catalyst is recycled to said lower zone.

6. A process as in claim 5, wherein the second step is carried out by maintaining the catalyst particles at a temperature of from 750° to 950° C. in the presence of oxygen in an amount insufficient for complete burning of the coke deposited on the catalyst particles in the first step and a fuel added as required in the second step.

7. A process as in claim 5, further comprising a third step of regenerating the catalyst particles by roasting iron sulfide in the catalyst particles at a temperature of from about 600° to 1,000° C.

* * * * *

UNITED STATES PATENT AND TRADEMARK OFFICE
CERTIFICATE OF CORRECTION

PATENT NO. : 4,597,856

DATED : July 1, 1986

INVENTOR(S) : Susumu Yoshioka et al

It is certified that error appears in the above-identified patent and that said Letters Patent is hereby corrected as shown below:

Please amend the patent under the heading [73] Assignee by deleting "Processing Research Association of Residual Oil" and substituting therefor --Research Association for Residual Oil Processing--.

Signed and Sealed this

Sixth Day of January, 1987

Attest:

DONALD J. QUIGG

Attesting Officer

Commissioner of Patents and Trademarks